Nov. 26, 1963  E. S. TAMM  3,112,417
BEARING SEAL FOR ELECTRIC MOTOR
Filed April 18, 1962
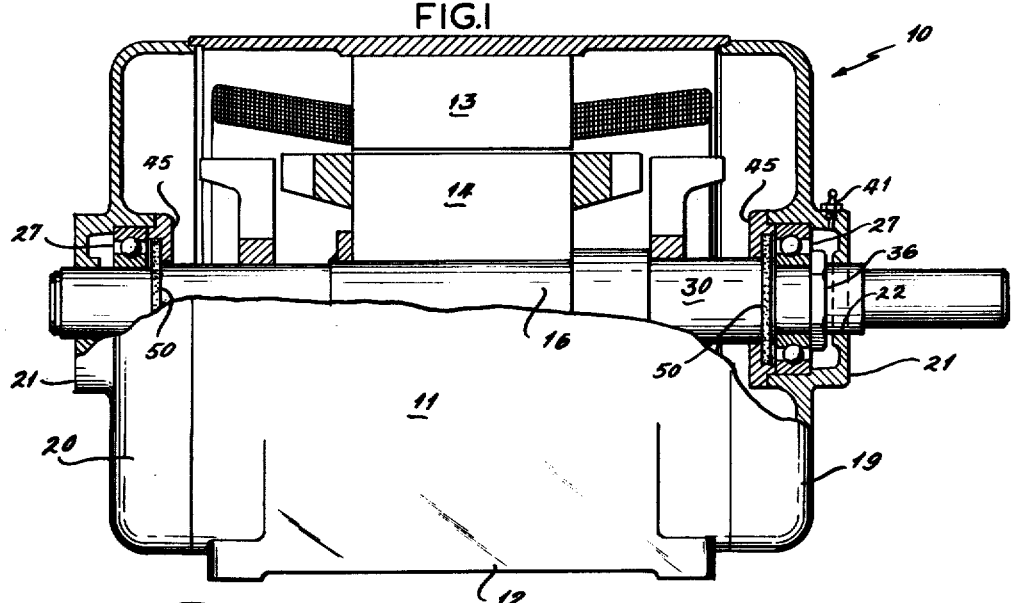
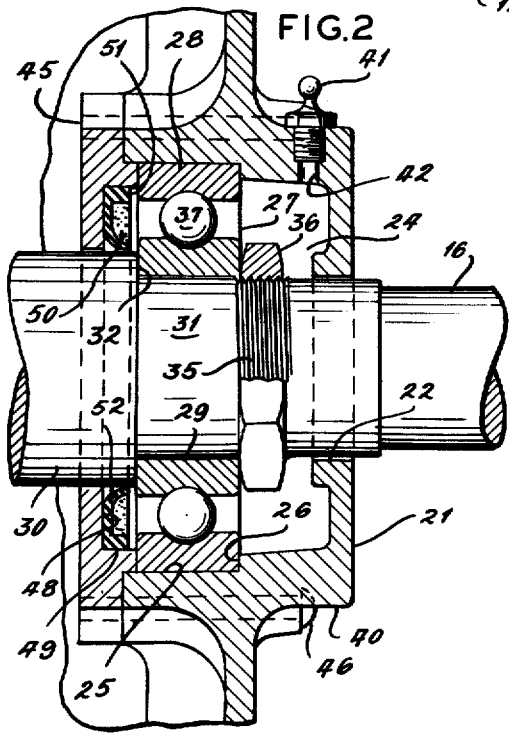 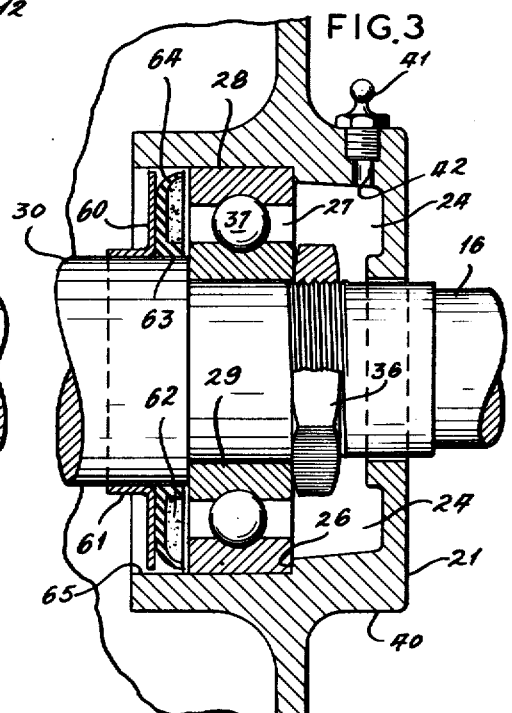
INVENTOR.
EMIL S. TAMM
BY
Sutherland Polster & Taylor
ATTORNEYS.

United States Patent Office 3,112,417
Patented Nov. 26, 1963

3,112,417
BEARING SEAL FOR ELECTRIC MOTOR
Emil S. Tamm, Fort Smith, Ark., assignor to Baldor Electric Company, St. Louis, Mo., a corporation of Missouri
Filed Apr. 18, 1962, Ser. No. 188,320
3 Claims. (Cl. 310—90)

This invention relates to electric motors and more specifically to the bearings of an electric motor of the kind adapted to be lubricated at intervals by a grease gun applied to a grease fitting on the bearing. It is difficult, if not impossible, to lubricate a bearing in this manner with grease under pressure and not have some of the grease leak out of the bearing to within the electric motor housing. Consequently, it is not unusual to find a substantial accumulation inside the motor after repeated applications of the grease gun, even when carried out carefully and at normal intervals. As will be readily understood, the amount of grease leaking inboard of the bearings of an electric motor will eventually accumulate on the motor windings causing deterioration of the insulation; and when the motor is not of the dust-proof type, the grease, when thrown out centrifugally, may come to rest on an electrically live part and accumulate dust thereon, which eventually may result in a short circuit or other circuit fault.

It is an object of this invention to provide a grease seal having such properties and so constructed and mounted in the electric motor bearings as to prevent the leakage of grease to the inside of the motor housing.

In accordance with this invention such a seal is provided with a flexible sealing lip so arranged that the lip actually contacts a relatively moving cylindrical surface to effect a tight seal therewith when subject to internal fluid pressure of the lubricant. The sealing lip normally has a running clearance with a relatively rotating cylindrical surface in a motor part along which grease might otherwise escape from the motor bearing, but constructed and arranged to be forced into contact with the relatively rotating cylindrical surface on each application to the motor bearing of grease under pressure so as to form a tight grease seal for such period of time as there persists such pressure, within the bearing, as would otherwise force the grease inwardly along the shaft.

In use, electric motors may be installed to operate in a position with the motor shaft horizontal, inclined or vertical, and this invention is applicable to all such cases, although this description will assume, for the purpose of convenience in explanation, that the motor shaft is horizontal.

Electric motors usually have bearing housings mounted in or otherwise sustained by end bells at each end of the stator housing. Such a bearing housing usually contains roller bearings or ball bearings which must be lubricated. The shaft of the rotor is suitably journalled in these ball bearings and projects outwardly thereof through an end plate on the bearing housing. In one common form, the inwardly facing open side of each bearing housing is substantially closed by an apertured bearing ring having a loose fit on the shaft, which ring is secured to the bearing housing to hold it against axial movement with respect to the motor shaft. In applying the parent invention to such a motor, there is provided a centrally apertured cup-shaped member having a cylindrical flange at one periphery and a radially extending end wall terminating in a curved lip at its other periphery. The lip may be at either the inner or outer periphery of the seal, but, in either event, has its free end pointed near-axially of the motor shaft toward the adjacent outer end of the shaft, so as to form with the flange and end wall, an annular trough whose open side is addressed to the interior of the bearing housing. The lip is relatively more flexible than the other parts of the cup-shaped member. This lip, in relaxed condition, has a running clearance with at least one of two relatively rotating cylindrical surfaces in the bearing. It also is mounted fixed with respect to another of the relatively rotating surfaces. On the outside of the motor, there is a grease fitting for each bearing communicating with the interior of the bearing housing. A pressure relief passage may also be provided between the bearing housings and the outside of the motor to prevent a prolonged pressure condition within each bearing housing.

On each application of grease through the fitting, pressure inside the bearing housings may increase to the extent that the flexible lip yields and engages with that one of the relatively rotating cylindrical surfaces with which it normally has a running clearance. This seals off communication between the interior of the bearing housing and the parts of the motor which would be adversely affected by leakage of grease inwardly along the shaft. After the excess grease pressure dissipates itself, lip pressure on the relatively rotating cylindrical surface in the motor decreases until a running clearance again exists. Since grease pressure exists within the bearing housings for only a short interval and because considerable time intervenes between greasings, the service imposed upon the seal is relatively light, and a relatively simple and inexpensive seal thus performs the function and has the life expectancy of much more expensive devices. This, comparative tests have substantiated.

Other objects and advantages of this invention will appear from the following detailed description which is in such clear, concise and exact terms as will enable any one skilled in the art to make and use the same when taken with the accompanying drawings, forming a part thereof, and in which:

FIG. 1 is a side elevation partly in section schematically illustrating an electric motor with bearings constructed in accordance with the teachings of this invention;

FIG. 2 is a fragmentary view in cross-section on an enlarged scale of one of the bearings of the motor shown in FIG. 1; and FIG. 3 is a fragmentary view in cross-section showing a modification of the bearing shown in FIG. 2.

Turning now to the drawings, FIG. 1 shows an electric motor generally indicated as 10 which has a cylindrical stator housing 11 and an integral mounting pedestal 12. Within the cylindrical stator housing 11 is a fixedly mounted stator ring 13 having poles supporting the usual field windings. Rotating within the stator ring 13 is an armature, or squirrel cage, 14 mounted keyed to a shaft 16.

Opposite open ends of the cylindrical stator housing 11 are closed by end bells 19 and 20 removably secured thereto. Since both end bells are the same, only one will be described in detail. End bell 19 is formed with a bearing housing 21 which is apertured at 22 to receive the protruding end of the armature shaft 16. The aperture 22 is not a bearing support for the armature shaft 16, and, consequently, there is some clearance left between the inside of the aperture 22 and the outside surface of the armature shaft 16. Within the bearing housing 21 is a cavity 24 which forms a lubricant holding chamber for the bearing supporting the shaft 16. Preferably the inner surface of the cavity 24 is provided with a cylindrical recess 25 and an inwardly facing shoulder 26 at the end of the recess. This recess 25 is large enough to accommodate the ball bearing 27 with the outer radial face of the outer race 28 seated against the shoulder 26 of the recess 25.

Shaft 16 is provided with a cylindrical portion 30 projecting beyond the armature 14, and this circular portion 30 is stepped as shown at 31 to form a shoulder 32. The inner race 29 of the ball bearing 27 has its inner radial face seated against the shoulder 32 on the stepped portion 31 of the armature shaft 16. The stepped portion 31 may be threaded as at 35 to receive a nut, or retainer, 36 clamping the ball bearing 27 securely in place on the shaft 16 and against the shoulder 32. It might be mentioned here that the balls 37 separate the inner race 29 from the outer race 28.

On the outer cylindrical surface 40 of the bearing housing 21 is a grease fitting 41 which is threaded into a passage 42 communicating with the cavity 24. Cavity 24 is in turn closed at the inner side of the end shield 19 by a retaining ring 45 which forms the inner wall of the cavity 24 and is secured in place by suitable screws, such as 46, passing through the bearing housing and threaded into holes in the retaining ring 45. The retaining ring 45 is formed with a recess 48 which has a stationary cylindrical surface 49. The recess 48 opens into and forms a part of the cavity 24. In the recess 48 is a centrally aperture cup-shaped member 50 with a peripheral flange 51 seated on the cylindrical surface 49 and a curved lip 52 which, together with the intervening radially extending wall, form an annular trough whose open side is addressed toward the ball race. The member 50 is preferably molded of a plastic material, such as acrylonitrile rubber, and the like, which is stable in the presence of lubricant; and is tapered toward the edge of lip 52 so that the lip is more flexible than other parts of the member. The curved lip 52 is so constructed that in its relaxed condition it has a running clearance with the cylindrical surface 30 of shaft 16. For example, the amount of clearance can be as much as ten to fifteen thousandths of an inch. Thus, the cylindrical surface 30 runs clear of the edge of the lip 52 under normal conditions when no more than normal pressure is present within the cavity 24. Under such normal conditions, the lip 52 assumes its relaxed position in which it has the aforementioned running clearance. In the absence of abnormal pressure within the cavity 24, the sealing lip 52 is not subject to substantial wear, but it adequately seals the bearing cavity to prevent leakage of grease along the shaft portion 30 where it can be spattered about the inside of the motor housing by the centrifugal action of the rotating shaft 16, or parts thereon with which the grease comes in contact.

At spaced intervals, the grease must be replenished in the cavity 24. During the greasing, when a grease gun is applied to the fitting 41, pressure can exist within the cavity 24 because in the normal greasing process, the gun is kept applied to the fitting until it is certain that the cavity 24 is filled. When the grease under pressure reaches the grease seal 50, it will not only force the cup-shaped seal into the cavity 48, but also the lip 52 against the rotating cylindrical portion 30 of the armature shaft 16. The amount of contact pressure between the lip 52 and the cylindrical portion 30 will depend upon the grease pressure within the cavity 24, but this pressure will gradually decrease due to the escape of the grease through the pressure relief passage left by the clearance between the aperture 22 and the portion of the armature shaft 31 which protrudes through the bearing housing 21. As the grease escapes through the relief passage, pressure in the cavity 24 decreases gradually, and, after a short period of time, the lip 52 returns to its so-called relaxed position in which it has a running clearance with the cylindrical portion 30 of shaft 16. Consequently, it is only during the actual greasing operation of the bearing, and for a short time thereafter, that the lip 52 is held forcibly against the cylindrical portion 30. It follows, therefore, that it is only during these periods that there will be any actual wear on the sealing lip 52. The remainder of the time it will run upon a thin film of grease and prevent seepage from the cavity 24 along the cylindrical portion 30. The grease seal 50, therefore, provides means to prevent damage to the motor from overgreasing of the bearings. It will be understood that the bearing in the end bell 20 may be constructed in the same manner as that just described.

Turning now to FIGURE 3, the embodiment therein shown is an inside-out version of that shown in FIGURE 2. Where the parts are identical, the same reference characters are applied, and, where the parts differ, they will be indicated by different reference characters. This description will be limited to the differences so as to avoid repetition.

In the embodiment of FIGURE 3, a flanged ring 60, preferably of metal, is mounted on the cylindrical portion 30 of shaft 16 to revolve therewith. Ring 60 is formed with a tubular flange 61 which may be secured in fixed position on the shaft 16 by any suitable means so that it will be held against movement axially of the shaft in the direction away from the ball race. The tubular portion 61 may have a press fit with the shaft, or it may be retained in place by a groove in the shaft, a shoulder on the shaft, or similar well-known expedients. Disposed against the inner face of ring 60 is a centrally apertured cup-shaped grease seal 62 of lubricant resistant rubber-like material. At the inner periphery of the seal is a cylindrical flange 63 in gripping engagement with the cylindrical surface 30 on the motor shaft. At the outer periphery of the grease seal is a relatively flexible curved lip 64 positioned to form an effective grease seal at the cylindrical surface 65 of the cavity 24.

As in the prior embodiment, the lip 64 in relaxed position has a running clearance with the cylindrical surface 65 and will ride upon the thin layer of grease which ordinarily will cover this surface. The sealing lip 64 will only be forced against the cylindrical surface 65 when abnormal grease pressure exists within the cavity 24. While as in the previous embodiment, the lip 64 is proportioned to be more flexible than the balance of member 62, care should be exercised that the curved lip is not so flexible that it will straighten and engage surface 65 under the influence of centrifugal force, to which it is subject in operation, that is, unassisted by abnormal grease pressure within the bearing housing. When the lip is thus properly proportioned, it will be subject to very little wear during the long periods of time which normally elapse between greasing of the bearing. The seal, however, is present and effective to prevent over-greasing and undesirable migration of the grease.

Changes in and modifications of the construction described may be made without departing from the spirit of my invention or sacrificing its advantages.

Having thus described the invention, what is claimed and desired to be secured by Letters Patent is:

1. In an electric motor, (a) a stator housing with a generally cylindrical part mounting the stator and its windings, (b) a rotor on a shaft arranged centrally within said stator, said shaft having cylindrical surfaces at axially spaced positions therein, (c) radial shoulders on said shaft adjacent said cylindrical surfaces and facing outwardly, (d) ball bearing races on said shaft at each end of said shaft with the inwardly facing radial face of the respective races positioned against an outwardly facing shoulder of said motor shaft, (e) end bells fixed on the opposite open ends of the cylindrical part of said stator housing, (f) bearing housings with axially aligned apertures for said shaft in each of said end bells through which said motor shaft projects, said bearing housings surrounding the respective portions of said motor shaft having said outwardly facing shoulders, and said bearing housing having inwardly facing shoulders disposed opposite to the outer radial face of the respective ball bearing races and providing a cavity thereabout, (g) a grease fitting on the exterior of each of said bearing housings communicating with said cavities therein for pressure lubrication of said bearings, (h) retaining rings embracing the respective axial cylindrical portions of said shaft, said rings being fixed in position axially of said shaft and partially closing the space between said shaft and said bearing housings at the interior ends thereof, (*i*) stationary cylindrical surfaces within said cavities of said ball bearing races located opposite the respective spaced cylindrical surfaces on said shaft, (*j*) annular members of rubber-like material, having a flange at one periphery, a curved lip at the other periphery and an intervening radially extending end wall, to form an annular trough between said flange and said lip, said lip being relatively more flexible than the other parts of said members, one of said members being disposed between the ball bearing races, and their adjacent retaining rings with the end walls of the respective annular members engaging their adjacent retaining rings, and the flanges of the respective annular members being in gripping engagement with an adjacent one of said cylindrical surfaces, the flexible curved lip of the respective annular members extending in proximity to the other adjacent one of said cylindrical surfaces and having a running clearance therewith, and the open side of the annular trough in the respective annular members being addressed toward the adjacent ball bearing race; and each of said curved lips being so disposed with respect to its adjacent retainer ring and its proximate one of said cylindrical surfaces as to co-act therewith and form a grease seal therebetween in response to abnormal grease pressure within said trough, said pressure flattening said curved lip and forcing it into engagement with said proximate cylindrical surface and forcibly maintaining such engagement to prevent migration of grease inwardly of the shaft for a period sufficient to allow the abnormal grease pressure to dissipate.

2. The combination of claim 1 wherein the curved lip of said annular member is in proximity to and arranged for engagement, under abnormal grease pressure conditions, with the said cylindrical surfaces on the shaft.

3. The combination of claim 1 wherein the curved lip of said annular member is in proximity to and arranged for engagement, under abnormal grease pressure conditions, with the said stationary cylindrical surfaces.

No references cited.

UNITED STATES PATENT OFFICE
CERTIFICATE OF CORRECTION

Patent No. 3,112,417            November 26, 1963

Emil S. Tamm

It is hereby certified that error appears in the above numbered patent requiring correction and that the said Letters Patent should read as corrected below.

Column 2, line 6, after "bearing" insert a comma; column 3, line 20, for "aperture" read -- apertured --.

Signed and sealed this 12th day of May 1964.

(SEAL)
Attest:

ERNEST W. SWIDER            EDWARD J. BRENNER
Attesting Officer            Commissioner of Patents